United States Patent [19]

Duly

[11] 4,165,854

[45] Aug. 28, 1979

[54] ECCENTRIC PAWL FOR CHAIR LOCKING DEVICE

[75] Inventor: Michael J. Duly, Spring Hill, Kans.

[73] Assignee: Cramer Industries, Inc., Kansas City, Kans.

[21] Appl. No.: 891,449

[22] Filed: Mar. 29, 1978

[51] Int. Cl.² ............................................. F16M 11/04
[52] U.S. Cl. .................................... 248/408; 403/324; 403/328; 248/345
[58] Field of Search ............................... 248/407–409, 248/423, 354 P; 292/58, 60, 61; 297/338, 345; 403/108, 322, 324, 325, 328

[56] References Cited

U.S. PATENT DOCUMENTS

| 701,238 | 5/1902 | Williams | 292/61 |
|---|---|---|---|
| 787,038 | 4/1905 | Hahn | 292/58 |
| 1,491,685 | 4/1924 | Eicher et al. | 248/408 |
| 1,610,069 | 12/1926 | Weber | 248/388 |
| 2,113,753 | 4/1938 | Wilson | 292/61 |
| 3,443,784 | 5/1969 | Walkinshaw | 248/408 |
| 3,770,236 | 11/1973 | Marsh et al. | 248/408 |
| 4,021,126 | 5/1977 | Deeter et al. | 248/408 |
| 4,113,221 | 9/1978 | Wehner | 248/408 |

FOREIGN PATENT DOCUMENTS

| 1334083 | 6/1963 | France | 403/108 |
|---|---|---|---|
| 123262 | 2/1919 | United Kingdom | 292/61 |

Primary Examiner—Lawrence J. Staab
Attorney, Agent, or Firm—Fishburn, Gold & Litman

[57] ABSTRACT

A chair locking device engageable with a movable member for retaining same in a selected position relative to a stationary support member. The locking device includes a barrel mounted on the stationary member and a plunger within the barrel having an eccentrically mounted pawl on the engagement end thereof movable into and out of a selected one of a plurality of sockets in the movable member in response to movement of a cam follower on the plunger along a cam surface of the barrel. The pawl is mounted on the plunger so that the pawl rotates into a downward position relative to the plunger axis when fully extended into the selected socket. Movement of the cam follower is effected by a handle in engagement with the cam follower and cooperating portions on the cam and lock structure retain the plunger at an end of its travel until relative movement is positively effected by rotating the handle. Additionally, downward force on the eccentrically mounted pawl is sufficiently high when a person is seated on the chair so that rotation and withdrawal of the pawl from the selected socket cannot normally be accomplished until the person arises from the seat.

10 Claims, 7 Drawing Figures

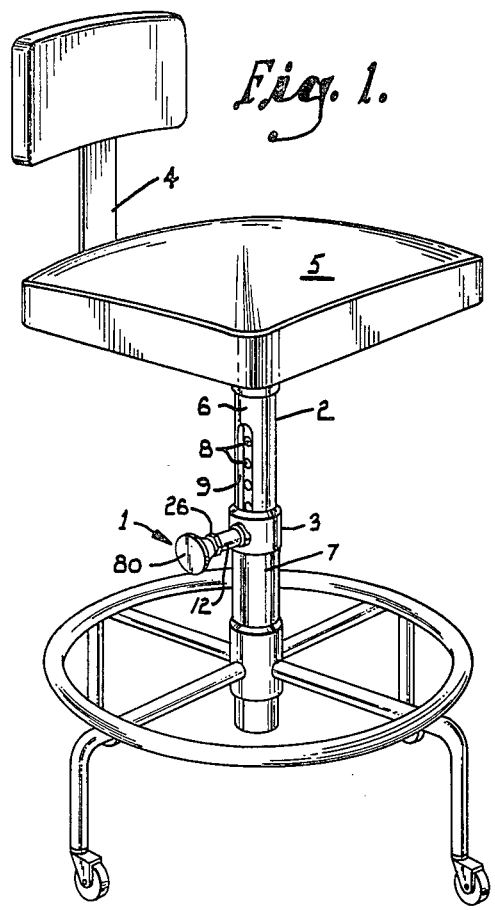
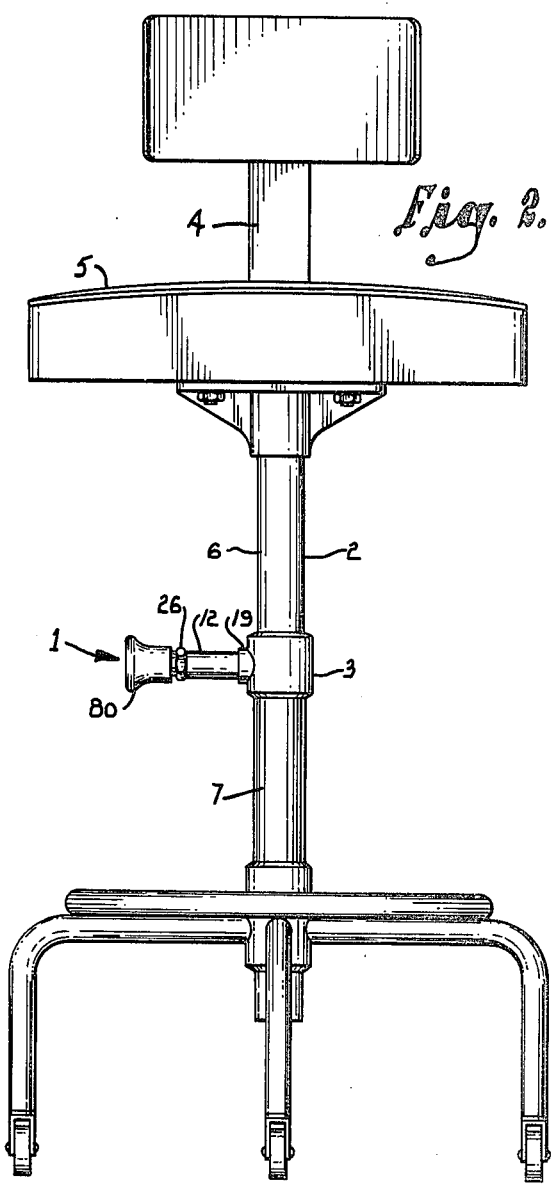
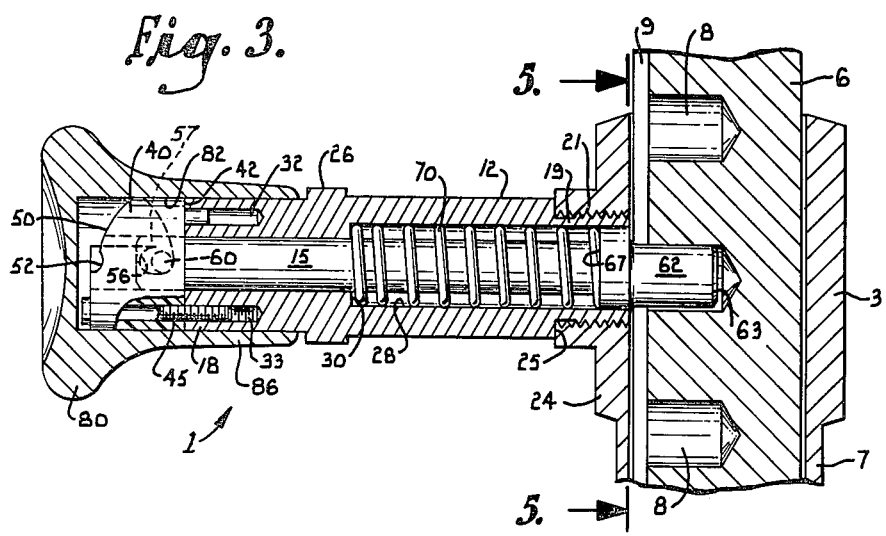

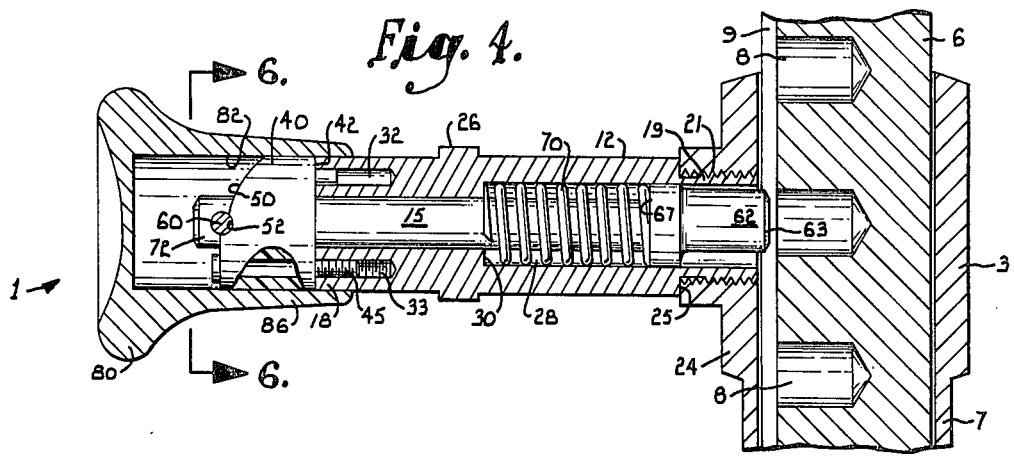
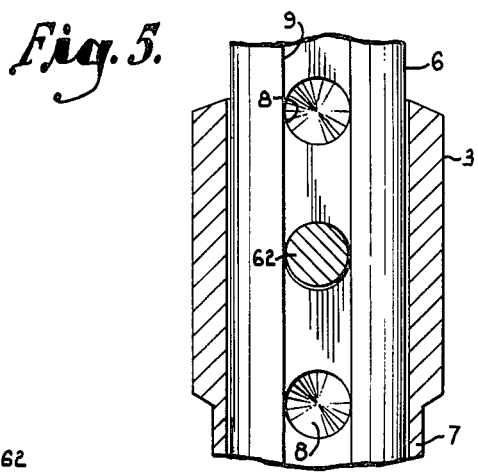
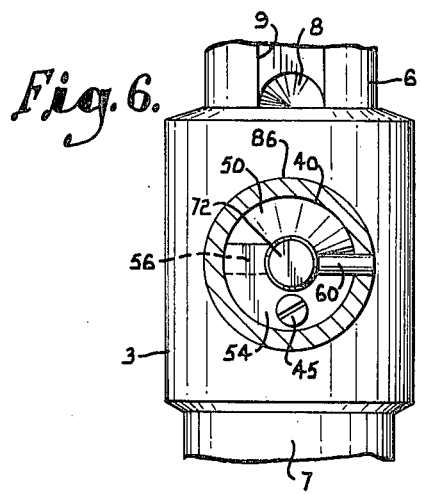
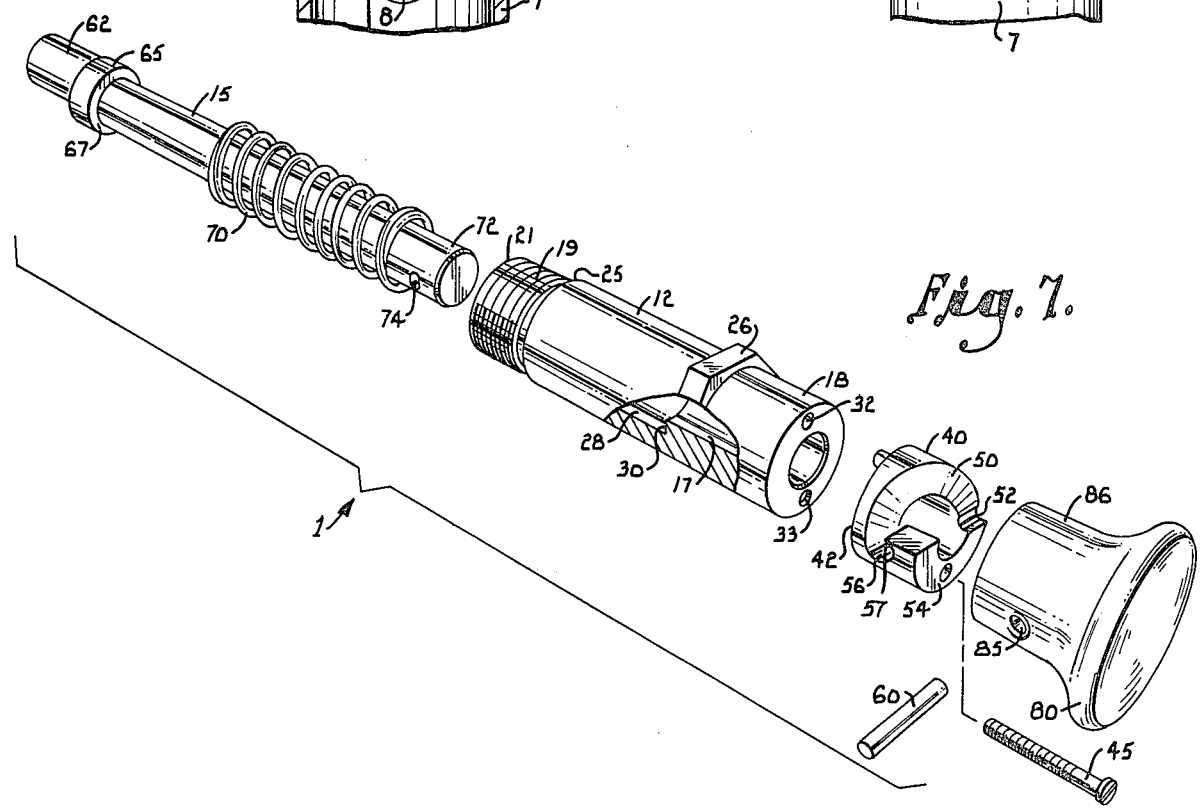

ECCENTRIC PAWL FOR CHAIR LOCKING DEVICE

The present invention relates to locking devices and more particularly to a locking device having portions engageable with a movable member for retaining same in a selected position relative to a stationary support member.

Chair and stool structures having vertical seat height adjustment usually have a locking plunger engaging one of a plurality of recesses or sockets in a seat post to hold same in a selected height position. Heretofore, these locking structures have guarded only against inadvertent release and require a person to grip a handle thereof and actuate a release mechanism so that seat adjustment may be accomplished. After extended periods of use, these locking mechanisms become worn and loose and inadvertent disengagement may occur. It will be appreciated that a person seated upon a chair or stool, should inadvertent disengagement occur, is subjected to a possibility of injury, often leading to liablity for damages by the manufacturer and other parties in the chain of distribution. Moreover, particularly in conjunction with the use of such chairs and stools for instruction of school children, horseplay may occur and one student may seek to startle another by grasping and actuating the release mechanism of the chair of another with the effect that injury to the seated student may occur.

The principal objects of the present invention are: to provide a locking device that eliminates the above noted disadvantages of heretofore known seat locking mechanisms; to provide such a locking device having portions engageable with a movable member for retaining same in a selected position relative to a stationary support member; to provide such a locking device characterized by the absence of exposed portions subject to accidental engagement effecting release of the locking device and undesired movement of the movable member; to provide such a locking device characterized by the absence of exposed portions which could cause injury to a person or damage to clothing; to provide such a locking device wherein operative parts are enclosed within a barrel and including a plunger having a cam follower thereon which is movable along a cam surface in response to turning of a handle sleeved on a barrel enclosing the plunger therein; to provide such a locking device which has an eccentrically mounted pawl engageable with a selected movable member socket which is urged downwardly by the weight of a person sitting on the seat member thereof and thereby prevents inadvertent or even purposeful disengagement thereof until weight is released from the seat portion; to provide such a locking device which is particularly useful on a chair or stool structure having a vertically adjustable seat portion supported on a post depending therefrom and received within a tubular support standard or base; and to provide such a locking device which is economical to manufacture, durable in construction, positive in operation, and particularly well adapted for the proposed use.

Other objects and advantages of this invention will become apparent from the following description taken in connection with the accompanying drawings wherein are set forth by way of illustration and example certain embodiments of this invention.

FIG. 1 is a perspective view of a chair structure having mounted thereon a locking device embodying features of the present invention.

FIG. 2 is an enlarged side elevational view of the locking device mounted on the chair structure.

FIG. 3 is an enlarged longitudinal sectional view showing a plunger in an extended position.

FIG. 4 is an enlarged longitudinal sectional view showing the plunger in a retracted position.

FIG. 5 is an enlarged transverse sectional view showing a post and sockets of the chair structure and having a pawl inserted in a selected socket.

FIG. 6 is an enlarged transverse sectional view showing a cam surface and a cam follower in engagement therewith.

FIG. 7 is an enlarged exploded perspective view of the components of the locking mechanism.

As required, detailed embodiments of the present invention are disclosed herein. However, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring more in detail to the drawings:

The reference numeral 1 designates generally a locking device having portions engageable with a movable member 2 for retaining same in a selected position relative to a stationary support member 3. The locking device 1 is particularly useful on a chair or stool structure 4 having a vertically adjustable seat portion 5 supported on a post 6 depending therefrom and received within a tubular support standard 7. The locking device 1 is constructed so that neither accidental engagement nor intentional attempted actuation of the locking device 1 will cause a plunger thereof, described below, to move out of a respective selected socket 8 in a groove 9 in the post 6 and allow the seat portion 5 to slide downwardly.

The major structural components of the locking device 1 include an elongated, tubular barrel 12 mounted on the support standard 7 and having a rotatable and reciprocable pin or plunger 15 extended therethrough which has portions, described below, engageable with a selected socket 8 to accomplish the desired secure engagement and selective locking of the telescoping post 6 in a desired amount of extension or retraction relative to the tubular standard 7.

In greater detail, the barrel 12 includes a handle end 18 and an attachment end 19 which is capable of mounting to the tubular support standard 7 in any suitable manner. In the illustrated embodiment, the attachment end 19 is of a reduced diameter and has threads 21 thereon engaged within a commensurately sized threaded aperture 23 extended normally through a relatively thick sidewall 24 of the tubular standard 7 which has sufficient strength to support the locking device 1. An abutment surface or boss 25 is formed at the juncture of the reduced attachment end 19 with the remainder of the barrel 12 for rigid engagement with the sidewall 24. Additionally, a collar 26 having flat engagement faces, such as are hexagonally arranged in the illustrated example, is positioned on the barrel 12 and disposed from the attachment end 19 a sufficient distance to permit a wrench (not shown) to engage same for rotation and securing the barrel 12 to the sidewall 24. For a purpose later described, the barrel 12 includes a bore 17 extended axially inwardly from the handle end 18 and counterbore 28 extended inwardly from the attachment end 19 to a point approximately midway through the barrel 12 and terminating in an interior shoulder 30 at the juncture thereof with the bore 17. The opposite or handle end 18 forms a flat face having a pair of diametrically opposed longitudinally extending bores 32 and 33 affording nonrotative attachment of a cam head 40 coaxially with the barrel 12.

The cam head 40 can be formed integrally with the barrel 12, or, as in the illustrated example, comprise a relatively short cylindrical body having a flat end 42 with engagement means thereon for mounting the same coaxially to the handle end 18. In the latter example, a diametrically opposed pin or lug 43 and a bore 44 for receiving a fastener, such as a bolt 45, therethrough are positioned for alignment with the bores 32 and 33 and mounted therein, thereby securely and nonrotatably connecting the cam head 40 to the barrel 12. A bore 48 extends through the cam head 40 and is coaxially aligned with the bore 17 and of the same diameter thereof, thereby forming a continuous open bore from the attachment end 19 through the barrel 12 and through the cam head 40. A cam surface 50 is formed in the cam head 40 and comprises a spiral or helix surrounding the bore 48 and extending between an idented notch 52 adjacent the free end 54 of the cam head 40 and adapted to retain a cam follower 60 therein when the same is in one of its positions and a second indented pocket or notch 56 for receipt of the cam follower 60 when the same is in another of its positions, described below. A projecting lip or hook 57 extends toward the notch 56 and closely overlies the cam follower 60 when the same is received into the notch 56, thereby preventing the cam follower 60 from being pulled directly rearwardly and requiring movement at least partway along the cam surface 50. The cam follower 60, also further described below, is connected to the plunger 15 and operable to urge the same through the barrel 12 and into and out of engagement with a selected socket 8. It will be apparent that the cam surface 50 may have various selected degrees of inclination and in the present example, an inclination of approximately 20 degrees provides sufficient travel without requiring undue rotative force to drive the plunger 15.

The plunger 15 comprises an elongated, generally cylindrical rod slidably and rotatably positioned within the bore 17 and having a reciprocal movement therethrough for moving a free end pawl 62 into and out of a selected socket 8. A collar 65 of greater diameter than the plunger 15 is positioned at the juncture of the pawl 62 and the remainder of the plunger 15 and provides a supporting bearing for rotating the plunger 15 within the counterbore 28 adjacent the attachment end 19. A shoulder 67 on the side of the collar 65 oppositely of the pawl 62 provides an engagement or abutment surface for one end of a resilient means, described below, which urges the pawl 62 outwardly of the attachment end 19 and into a selected socket 8.

The pawl 62 comprises a relatively short cylindrical pin or bolt of larger diameter than the plunger 15 and having a revolutionary or longitudinal axis thereof disposed laterally or eccentrically from the revolutionary axis of the plunger 15 for helical or orbital motion thereof as the plunger 15 is rotated, as by movement of the cam follower 60 along the cam surface 50. A chamfered end surface 63 of the pawl 62 facilitates sliding thereof into a socket 8. Commensurately, the pawl 62 is of lesser diameter than that of the socket 8 for permitting slight lateral movement thereof as the plunger 15 rotates and the pawl 62 orbitally revolves. To further facilitate insertion and rotation of the eccentric pawl 62, the post 6 is of lesser diameter than the standard 7 for shifting both horizontally and vertically within the standard 7 as connection is accomplished.

The resilient means, described above, also maintains the cam follower 60 in engagement with the bottom of the notch 56 in the cam head 40. In the illustrated example, the resilient means comprises a coil spring 70 sleeved on the plunger 15 and abutting the collar shoulder 67 on one end thereof and the barrel interior shoulder 30 at the other end thereof for compression of the coil spring 70 therebetween when withdrawing the pawl 62 from the socket 8. An opposite end 72 of the plunger 15 includes a bore 74 extended transversely therethrough for a purpose later described and a chamfered end surface 75 facilitating sliding movement through the barrel bore 17 and the cam head bore 44.

A handle 80 affixed to the plunger end 72 provides means for grasping and rotating the same for movement of the plunger 15. The handle 80 has a generally cylindrical recess 82 therein to receive the cam head 40 and sleeve over the barrel handle end 18, thereby surrounding the cam head 40. A bore 85 which is extended through the sidewall 86 of the handle 80 and opening into the recess 82 permits a pin or cam follower 60 to be driven therethrough and into the aligned bore 74 of the plunger end 72, thereby securely connecting the handle 80 to the plunger 15. It will be apparent that, as the handle 80 is turned, the cam follower 60 is urged against the cam surface 50 by the resilient coil spring 70, thereby indicating a preferred extended orientation of the plunger pawl 62 relative to the barrel 12. Accordingly, the resistance of the coil spring 70 must be overcome when rotating the handle 80 to move the pawl 62 into the interior of the barrel 12 and from the socket 8.

In the use of the locking device 1, the barrel attachment end 19 is connected to receiving parts of the tubular standard 7 and secured therein using a wrench in engagement with the collar 26. The pawl 62 is withdrawn from the interior of the standard 7 so as to be clear of the post 6 and allow free telescopic movement thereof. To accomplish this, the handle 80 is grasped and rotated to move the cam follower 60 outwardly along the cam surface 50 until the same is received into and retained by the notch 52. The post 6 may now be inserted into the tubular standard 7 and a desired extension or height of the adjustable seat 5 can be selected. Engagement of the locking device 1 is accomplished by rotating the handle 80 and moving the cam follower 60 inwardly whereupon the spring 70 expands as the pawl 62 extended outwardly of the attachment end 19. As the pawl 62 extends, the chamfered end 63 thereof slides into the selected socket 8 and, in a helical or orbital movement, the pawl 62 rotates eccentrically of the axis of the plunger 15 as the pawl 62 travels to full extension. Accordingly, slight horizontal rotation of the post 6 along the vertical axis thereof may be required because of the eccentric position of the pawl. When the pawl 62 is fully extended, the cam follower 60 is held in the notch 56 by the outward tension of the spring 70.

The cam follower 60 is preferably received in the notch 56 and rotation of the plunger 15 thereby limited when the pawl 62 is rotated into a lower hemispherical segment of the revolutionary axis of the plunger 15. Full extension of the pawl 62 when at the bottom of its eccentric orbit thus serves to reduce stress on the cam follower 60 as it is thereby aligned with the lines of stress through the seat post 6. It will be appreciated that once significant weight is placed on the seat 5, such as by a person sitting on same, considerable and extraordinary force is required to rotate the pawl 62 upwardly helically outwardly of the socket 8. When using a chair or stool 4 of conventional dimensions and having a handle 80 adapted to fit within the palm of most individuals, an ordinary person cannot normally exert sufficient rotative force to withdraw the pawl 62. Typically, when a weight of more than 50 pounds is resting on the seat 5 the above described release mechanism cannot be operated. This of course necessitates, in all but the most extraordinary circumstances, that a person seated on same must arise before the seat 5 may be adjusted, thereby obviating possibilities of inadvertent disengagement of the locking device and attendant possible injury.

It is to be understood that while I have illustrated and described one form of my invention, it is not to be limited to the specific form or arrangement of parts herein described and shown.

What is claimed and desired to secure by Letters Patent is:

1. In a chair structure having a vertically adjustable seat portion supported on a post depending therefrom and slidably received in a bore of a support standard, a locking device comprising:
   (a) a barrel having an attachment end mounted on a wall of said support standard, said barrel having a through bore extending from end-to-end thereof and communicating at said attachment end with a bore through said support standard wall;
   (b) an elongated plunger positioned in said bore and having opposite ends, one end thereof having a pawl engaged within a selected one socket of a plurality of sockets in said post and movable therefrom for adjusting the extension of said post relative to said support standard;
   (c) said pawl being eccentrically mounted on said plunger with a revolutionary axis of said pawl generally positioned below a revolutionary axis of said plunger when said pawl is engaged within said selected one socket, said pawl having orbital rotation during withdrawal from said socket whereby the overlying weight of said seat portion and said post urges said pawl rotatably downward relative to the axis of said plunger;
   (d) means slidably and rotatably mounting said plunger in said bore and providing said orbital rotation of said pawl upon rotation of said plunger; and
   (e) cooperative means on said plunger and said barrel operable to rotate said plunger in said barrel and move said eccentrically mounted pawl into and out of engagement with a selected socket.

2. The chair structure set forth in claim 1 including:
   (a) a cam surface adjacent the other end of said barrel, said cam surface being helically inclined longitudinally of said barrel; and
   (b) a cam follower extended from the other end of said plunger and in engagement with said cam surface and spirally movable along said cam surface.

3. The chair structure set forth in claim 1 including:
   (a) resilient means cooperatively mounted on barrel and on said plunger and urging said pawl outwardly of said attachment end and into a selected one of a plurality of sockets in said post.

4. The chair structure set forth in claim 3 wherein:
   (a) said barrel includes a counterbore extended inwardly from said attachment end, said counterbore and said bore having a juncture within said barrel and including a shoulder at said juncture;
   (b) said plunger has a collar adjacent said barrel attachment end rotatably supporting said plunger within said counterbore; and
   (c) said resilient means includes a coil spring sleeved between said shoulder and said collar.

5. The chair structure set forth in claim 2 wherein:
   (a) said cooperative means includes a cylindrical member having an internal bore therein and sleeved on said other end of said barrel and surrounding said cam surface;
   (b) said other end of said plunger includes a bore extended transversely therethrough; and
   (c) said cam follower includes a pin extended through said cylindrical member and through said bore in said plunger.

6. The chair structure set forth in claim 2 wherein:
   (a) said cam surface is formed on a head having a bore extended therethrough and coaxial with said bore in said barrel and having said cam surface on one end thereof;
   (b) said other end of said plunger extends through said bore in said head and includes a bore extending transversely through said plunger;
   (c) said cooperative means includes a cylindrical portion having an internal bore and sleeved on said other end of said barrel and surrounding said head; and
   (d) said cam follower includes a pin extended through said handle cylindrical portion and through said bore in said plunger.

7. A locking device for a chair having a vertically adjustable seat portion supported on a post depending therefrom and slidably received in a bore of a support standard, said locking device comprising:
   (a) an elongate barrel having a free end and an attachment end with a through bore extending from end to end, said attachment end being adapted for connection to a chair stationary member;
   (b) an elongate plunger positioned in said bore and having engagement means cooperating with said barrel for helical reciprocation of said plunger through said bore, said plunger having a pawl connected thereto and extensible outwardly of said attachment end for insertable engagement with a selected one of a plurality of sockets in said chair post;
   (c) said pawl being eccentrically mounted on said plunger with a revolutionary axis of said pawl generally positioned below a revolutionary axis of said plunger when said pawl is engaged within said selected one socket; and
   (d) cooperative means on said plunger and said barrel operable to rotate said plunger helically within said barrel bore and engage said pawl within said selected one socket with said seat portion urging said post downwardly upon said pawl, thereby inhibiting upward rotation thereof against the weight of said post and said seat portion.

8. The locking device set forth in claim 7 wherein said engagement means include:
(a) a cam surface formed on said barrel free end, said cam surface being helically inclined longitudinally of said barrel; and
(b) a cam follower extended from said plunger and in engagement with said cam surface and helically movable along said cam surface.

9. The locking device set forth in claim 8 wherein:
(a) said cam surface has opposite ends respectively including indented shoulders for receipt of said cam follower when said pawl is respectively retracted within said barrel and extended from said barrel.

10. The locking device set forth in claim 7 wherein:
(a) said barrel includes a counterbore extended inwardly from said attachment end, said counterbore and said bore having a juncture within said bore and including a shoulder at said juncture;
(b) said plunger has a collar adjacent said attachment end and rotatably supporting said plunger within said counterbore; and including
(c) a resilient coil spring sleeved between said shoulder and said collar.

* * * * *